United States Patent
Hur et al.

(10) Patent No.: US 10,935,470 B2
(45) Date of Patent: Mar. 2, 2021

(54) ULTRA MICROTOME DEVICE

(71) Applicant: KOREA BASIC SCIENCE INSTITUTE, Daejeon (KR)

(72) Inventors: Hwan Hur, Daejeon (KR); Hee-Seok Kweon, Daejeon (KR); Kye-Sung Lee, Daejeon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 0 days.

(21) Appl. No.: 16/671,099

(22) Filed: Oct. 31, 2019

(65) Prior Publication Data
US 2020/0141837 A1 May 7, 2020

(30) Foreign Application Priority Data

Nov. 1, 2018 (KR) .................. 10-2018-0132944

(51) Int. Cl.
*G01N 1/06* (2006.01)
*G01N 1/28* (2006.01)

(52) U.S. Cl.
CPC ........ *G01N 1/06* (2013.01); *G01N 2001/2873* (2013.01)

(58) Field of Classification Search
CPC ............. G01N 1/06; G01N 2001/2873; G01N 2001/065
See application file for complete search history.

(56) References Cited

U.S. PATENT DOCUMENTS

| | | | | |
|---|---|---|---|---|
| 2003/0167892 A1* | 9/2003 | Foerderer | ............. | G01N 1/06 83/602 |
| 2006/0123970 A1* | 6/2006 | Raymond | ............. | G01N 1/06 83/698.11 |
| 2006/0272467 A1* | 12/2006 | Hendrick | ............. | G01N 1/06 83/730 |
| 2008/0118312 A1* | 5/2008 | Lihl | ............. | G01N 1/06 407/33 |
| 2015/0047490 A1* | 2/2015 | Fan | ............. | G01N 1/06 83/707 |
| 2017/0122844 A1* | 5/2017 | Chen | ............. | G06T 7/0004 |
| 2020/0041387 A1* | 2/2020 | Rhodes | ............. | G01N 35/00029 |
| 2020/0225123 A1* | 7/2020 | Zhou | ............. | F16H 3/34 |

FOREIGN PATENT DOCUMENTS

| | | | | | |
|---|---|---|---|---|---|
| DE | 2545877 A1 | * | 1/1977 | ............. | B26D 1/00 |
| GB | 795490 A | * | 5/1958 | ............. | G01N 1/06 |
| GB | 820138 A | * | 9/1959 | ............. | G01N 1/06 |
| KR | 20010013218 A | | 2/2001 | | |

* cited by examiner

*Primary Examiner* — Omar Flores Sanchez
(74) *Attorney, Agent, or Firm* — McCoy Russell LLP

(57) ABSTRACT

Provided is an ultra microtome device including: a specimen restraint part having a sample holder formed on one side in a length direction, wherein a specimen is mounted on the sample holder; a power part for providing power for implementing a motion of the specimen restraint part; an up and down motion implementing part including a first cam rotated by a force transmitted from the power part and a first shaft for implementing an up and down motion of the specimen restraint part in response to the rotation of the first cam; and a forward and backward motion implementing part including a second cam rotated by the force transmitted from the power part and a second shaft for implementing a forward and backward motion of the specimen restraint part in response to the rotation of the second cam, thereby implementing a more precise motion.

10 Claims, 8 Drawing Sheets

ULTRA MICROTOME DEVICE

CROSS-REFERENCE TO RELATED APPLICATIONS

This application claims priority under 35 U.S.C. § 119 to Korean Patent Application No. 10-2018-0132944, filed on Nov. 1, 2018, in the Korean Intellectual Property Office, the disclosure of which is incorporated herein by reference in its entirety.

TECHNICAL FIELD

The following disclosure relates to an ultra microtome device capable of fabricating and mounting nanometer thick sections.

BACKGROUND

In order to identify three-dimensional nanostructures, such as biological samples, a cutting microtome device capable of fabricating sections in nanometer units and a sample holder on which the fabricated sections may be mounted are required. The observation by a transmission electron microscope (TEM), a scanning electron microscope (SEM), an atomic force microscope (AFM), and the like is enabled through ultrathin sections fabricated as described above.

In order to increase the quality of fabrication of such ultra-thin sections, the microtome device needs to have a drive system capable of realizing accurate motion, thereby minimizing vibration generated when the microtome device is driven.

However, such a microtome device has been developed only for a sample holder and a stage, and at present, the drive system of the microtome device is no longer developed in an initial form that may only move vertically and horizontally.

Therefore, there is a need for a microtome device having a new drive system capable of minimizing vibration.

RELATED ART DOCUMENT

Patent Document (Patent Document 1) Korean Patent Laid-open Publication No. 2012-0013218 (Published Feb. 26, 2001 entitled "Surgical Microtomes")

SUMMARY

An embodiment of the present invention is directed to providing an ultra microtome device having a drive system capable of increasing the quality of fabrication of ultrathin sections by minimizing vibration.

In one general aspect, an ultra microtome device includes: a specimen restraint part 100 having a sample holder 110 formed on one side in a length direction, wherein a specimen is mounted on the sample holder 110; a power part 200 for providing power for implementing a motion of the specimen restraint part 100; an up and down motion implementing part 300 including a first cam 310 rotated by a force transmitted from the power part 200 and a first shaft 320 for implementing an up and down motion of the specimen restraint part 100 in response to the rotation of the first cam 310; and a forward and backward motion implementing part 400 including a second cam 410 rotated by the force transmitted from the power part 200 and a second shaft 420 for implementing a forward and backward motion of the specimen restraint part 100 in response to the rotation of the second cam 410.

The ultra microtome device may further include a power transmitting part 500 including a power transmitting shaft 510 which is a rotation shaft of the first cam 310 and the second cam 410, and a power transmitting pulley 520 coupled to one side of the power transmitting shaft 510 in a length direction thereof and receiving the force from the power part 200 to rotate the power transmitting shaft 510.

The ultra microtome device may further include a fixing plate 600 disposed on a side surface of the specimen restraint part 100, wherein a first rotation coupling part 121 rotatably coupled to the fixing plate 600 is formed on the other side of the specimen restraint part 100 in the length direction thereof.

One side of the first shaft 320 in the length direction may be coupled to one side of the specimen restraint part 100 in the length direction, and the other side thereof in the length direction may be disposed in contact with the first cam 310.

The specimen restraint part 100 may be divided into one side specimen restraint part 100A to which the sample holder 110 is coupled, and the other side specimen restraint part 100B to which the first rotation coupling part 121 is formed, and the other side specimen restraint part 100B may include a guide part 100B-1 in which a slide rail is formed, a slide member 100B-2 sliding along the guide part 100B-1, and an elastic coupling part 100B-3 connected to the slide member 100B-2 through an elastic member 100B-3A.

The second shaft 420 may include a slide shaft 421 positioned on one side thereof in the length direction and connected to the slide member 100B-2, a power transmitting shaft 422 positioned on the other side thereof in the length direction and disposed in contact with the second cam 410, and a connection shaft 423 having one side in the length direction rotatably coupled to the slide shaft 421, the other side in the length direction coupled to the power transmitting shaft 422, and a second rotation coupling part 423-1 formed on a side surface thereof and rotatably coupled to the fixing plate 600.

The ultra microtome device may further include a knife holder 700 disposed to be spaced apart from the sample holder 110 by a predetermined interval.

A rotation shaft coupling hole 311 into which the power transmitting shaft 510 is fitted may be eccentrically disposed in the first cam 310 having a circular cross-sectional shape.

The second cam 410 may have a first protrusion 411 of an arc shape having a radius length of L1 formed on one side in a radial direction and a second protrusion 412 of an arc shape having a radius length of L2 formed on the other side in the radial direction (L1<L2).

In another general aspect, an ultra microtome device for processing a target object 1 by repeatedly implementing a specific motion, includes: a specimen restraint part 100 in which a sample holder 110 on which a specimen is mounted is formed; a power part 200 for providing power for implementing a motion of the specimen restraint part 100; a first shaft 320 rotated by a force transmitted from the power part 200; a plurality of cams coupled to the first shaft 320 to be simultaneously rotated when the first shaft 320 is rotated, and having a specific shape for adjusting the motion of the specimen restraint part 100; and a plurality of shafts having one side in a length direction disposed in contact with any one of the cams and the other side in the length direction connected to the specimen restraint part 100 and converting a force pushed by the cam when the cam rotates into a force for implementing the motion of the specimen restraint part 100.

DETAILED DESCRIPTION OF EMBODIMENTS

Figure 1:
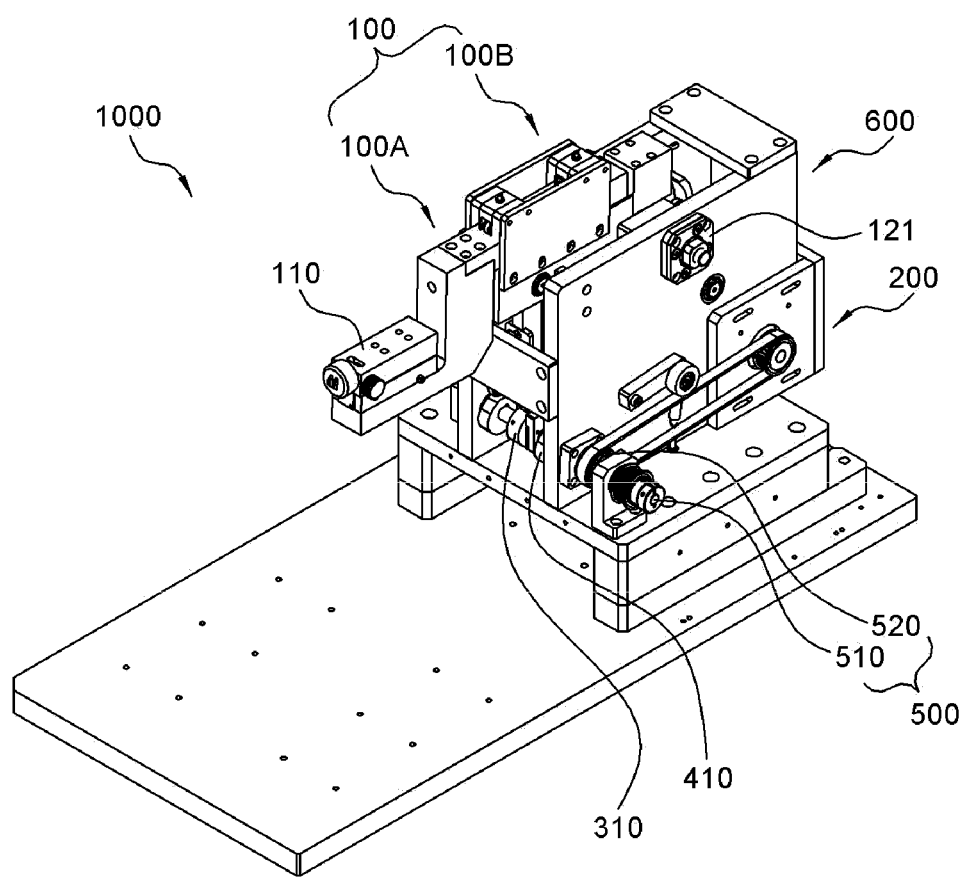
FIGS. 1 and 2 are perspective views illustrating an ultra microtome device according to the present invention.

Various advantages and features of exemplary embodiments of the present disclosure and methods accomplishing them will be apparent with reference to the exemplary embodiments described below in detail with the accompanying drawings. However, the present invention is not limited to the exemplary embodiments disclosed below, but may be implemented in various different forms, the present exemplary embodiments are merely provided to make the disclosure of the present invention complete and to fully inform the scope of the invention to those skilled in the art and the invention is only defined by the scope of the claims. Throughout the specification, like reference numerals refer to like components.

In describing the exemplary embodiments of the present invention, if it is determined that a detailed description of a known function or configuration may unnecessarily obscure the gist of the present invention, the detailed description thereof will be omitted. In addition, terms to be described later are terms defined in consideration of functions in the exemplary embodiments of the present invention, which may vary according to intentions or customs of users or operators. Therefore, the terms should be defined on the basis of the contents throughout the present specification.

Hereinafter, an ultra microtome device 1000 according to the present invention will be described with reference to the accompanying drawings.

Figure 2:
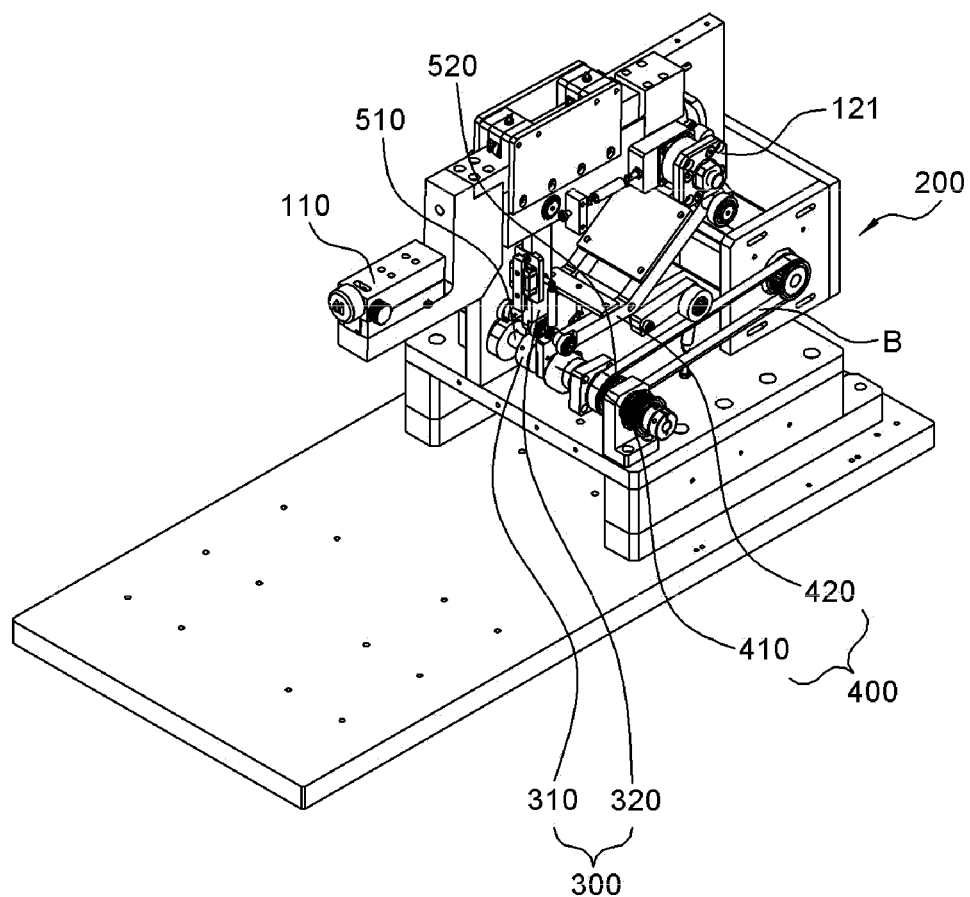

FIG. 1 illustrates an overall perspective view of the ultra microtome device 1000 according to the present invention and FIG. 2 illustrates a perspective view in which a fixing plate 600 is removed to illustrate a drive system of the ultra microtome device 1000 according to the present invention in more detail.

Referring to FIGS. 1 and 2, the ultra microtome device 1000 according to the present invention may include a specimen restraint part 100 having a sample holder 110 formed on one side in a length direction, wherein a specimen is mounted on the sample holder 110; a power part 200 for providing power for implementing a motion of the specimen restraint part 100; an up and down motion implementing part 300 including a first cam 310 rotated by a force transmitted from the power part 200 and a first shaft 320 for implementing an up and down motion of the specimen restraint part 100 in response to the rotation of the first cam 310; and a forward and backward motion implementing part 400 including a second cam 410 rotated by the force transmitted from the power part 200 and a second shaft 420 for implementing a forward and backward motion of the specimen restraint part 100 in response to the rotation of the second cam 410.

In detail, the specimen is mounted on the sample holder 110 and the up and down motion implementing part 300 and the forward and backward motion implementing part 400 constantly move the specimen restraint part 100 in a designated direction using the power transmitted from the power part 200, such that the specimen restraint part 100 may repeatedly implement any motion.

In this case, in order to enable the specimen restraint part 100 to repeatedly implement a designated constant movement, it is recommended that the first shaft 320 moves up and down by the rotation of the first cam 310 so that the up and down motion implementing part 300 implements the up and down motion of the specimen restraint part 100, and it is also recommended that the second shaft 420 moves forward and backward in response to the rotation of the second cam 410 so that the forward and backward motion implementing part 400 implements the forward and backward motion of the specimen restraint part 100.

In addition, referring to FIG. 1, the ultra microtome device 1000 according to the present invention may further include a power transmitting part 500 including a power transmitting shaft 510 which is a rotation shaft of the first cam 310 and the second cam 410, and a power transmitting pulley 520 coupled to one side of the power transmitting shaft 510 in a length direction thereof and receiving the force from the power part 200 to rotate the power transmitting shaft 510.

Figure 3:
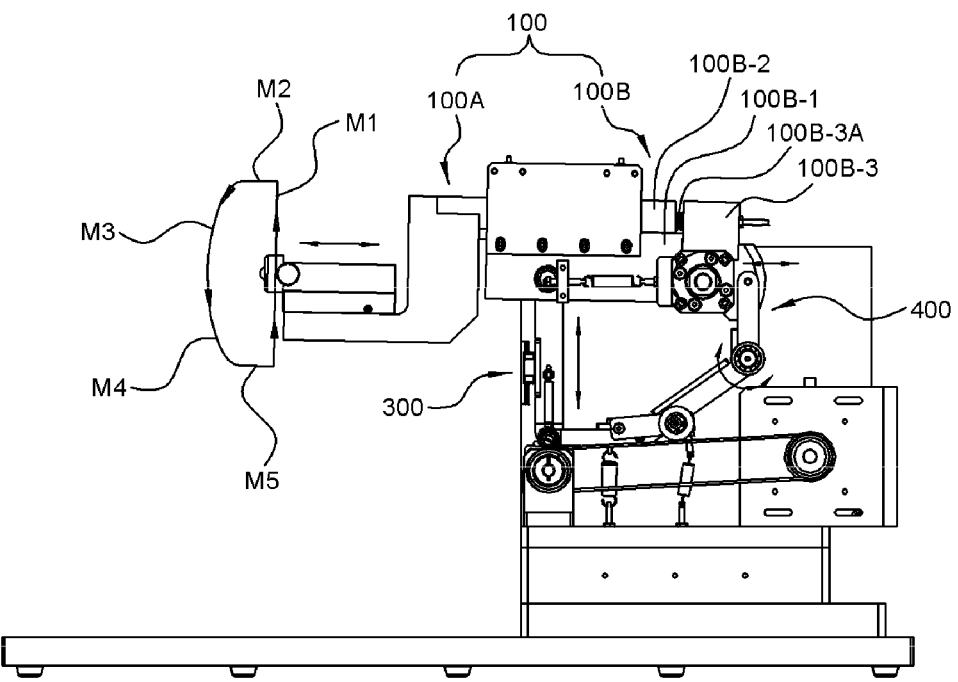
FIGS. 3 and 4 are side views illustrating the ultra microtome device according to the present invention.

In detail, as illustrated in the side view of FIG. 3, the up and down motion implementing part 300 moves the specimen restraint part 100 up and down, the forward and backward motion implementing part 400 moves the specimen restraint part 100 forward and backward, and the up and down movement and the forward and backward movement are combined, such that the ultra microtome device according to the present invention implements a first motion M1 directed upward, a second motion M2 moving forward, a third motion M3 moving in a curved shape forward and downward, a fourth motion M4 moving in a curved shape backward and downward, and a fifth motion M5 moving backward as illustrated in FIG. 3.

In this case, when the first cam 310 and the second cam 410 rotate separately, an error occurs in the process of combining the up and down motion implemented by the first cam 310 and the forward and backward motion implemented by the second cam 410, so that the specimen restraint part 100 may not implement a designated accurate motion. Therefore, according to the present invention, the problem caused when the first cam 310 and the second cam 410 rotate separately is solved by simultaneously rotating the first cam 310 and the second cam 410 by one power transmitting shaft 510 and rotating the power transmitting shaft 510 in response to a rotation of the power transmitting pulley 520 coupled to one side of the power transmitting shaft 510 in the length direction thereof, as illustrated in FIG. 2.

In addition, since the power transmitting pulley 520 is connected to the power part 200 by a belt B and a rotational force of a motor of the power part 200 is transmitted to the power transmitting pulley 520 through the belt B, the power transmitting pulley 520 rotates in response to a rotation of the motor.

That is, the motor rotates when the power part 200 operates, the rotational force of the motor is transmitted to the power transmitting pulley 520 through the belt B, and the power transmitting shaft 510 rotates when the power transmitting pulley 520 rotates, Therefore, the first cam 310 and the second cam 410 rotate at the same time in response to the rotation of the power transmitting shaft 510 so that the specimen restraint part 100 implements a complex motion corresponding to edge shapes of the first cam 310 and the second cam 410.

In addition, referring to FIGS. 1 to 3, the ultra microtome device 1000 according to the present invention further includes a fixing plate 600 disposed on a side surface of the specimen restraint part 100, and a first rotation coupling part 121 rotatably coupled to the fixing plate 600 may be formed on the other side of the specimen restraint part 100 in the length direction thereof.

In detail, the ultra microtome device 1000 according to the present invention implements curved motions, such as the third motion M3 and the fourth motion M4, in addition to simple linear motions, such as the first motion M1, the second motion M2, and the fifth motion M5, as described above with reference to FIG. 3.

In this case, the curved motions such as the third motion M3 and the fourth motion M4 may not be implemented by only the linear movement in which the specimen restraint part 100 simply moves up and down. Therefore, according to the present invention, the specimen restraint part 100 is rotatably coupled to the fixing plate 600 through the first rotation coupling part 121, such that the specimen restraint part 100 rotates upward with the first rotation coupling part 121 as the rotation shaft when the first shaft 320 pushes the specimen restraint part 100 upward in response to the rotation of the first cam 310, and the specimen restraint part 100 rotates downward when the first shaft 320 is restored to the position before moving upward by the first cam 310, thereby making it possible to move an end portion of a specimen fixed to the sample holder 110 in a curved form.

In addition, referring to FIGS. 1 to 3, according to the present invention, the specimen restraint part 100 is divided into one side specimen restraint part 100A to which the sample holder 110 is coupled, and the other side specimen restraint part 100B to which the first rotation coupling part 121 is formed. The other side specimen restraint part 100B includes a guide part 100B-1 in which a slide rail is formed, a slide member 100B-2 sliding along the guide part 100B-1, and an elastic coupling part 100B-3 connected to the slide member 100B-2 through an elastic member 100B-3A.

In detail, the specimen restraint part 100 has to implement the motion moving forward and backward in response to the force transmitted from the forward and backward motion implementing part 400. Therefore, the guide part 100B-1 is disposed to surround the slide member 100B-2 connected to one side specimen restraint part 100B, and a rail or a roller for guiding a moving direction of the slide member 100B-2 is positioned on an inner circumferential surface of the guide part 100B-1 facing the slide member 100B-2 so that the slide member 100B-2 is movable only forward and backward. The elastic coupling part 100B-3 connected to a rear side of the slide member 100B-2 is positioned at the rear end of the guide part 100B-1 with the elastic member 100B-3A such as a spring. As a result, when the second shaft 420 pushes the slide member 100B-2 to the front side, the elastic member 100B-3A is elastically deformed and stretched and the slide member 100B-2 moves to the front side, and when the second shaft 420 pulls the slide member 100B-2 backward, the elastic member 100B-3A is compressed and the slide member 100B-2 moves to the rear side.

Figure 4:
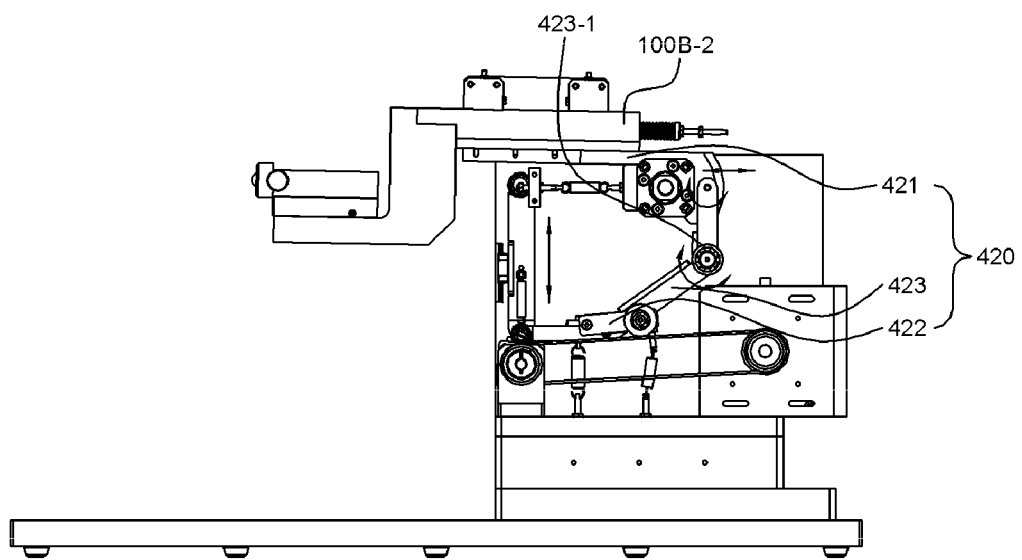

In addition, referring to FIG. 4, the second shaft 420 may include a slide shaft 421 positioned on one side thereof in the length direction and connected to the slide member 100B-2, a power transmitting shaft 422 positioned on the other side thereof in the length direction and disposed in contact with the second cam 410, and a connection shaft 423 having one side in the length direction rotatably coupled to the slide shaft 421, the other side in the length direction coupled to the power transmitting shaft 422, and a second rotation coupling part 423-1 formed on a side surface thereof and rotatably coupled to the fixing plate 600.

Referring to FIGS. 2 to 4, in detail, the power transmitting shaft 422 positioned on the other side in the length direction is disposed in contact with an outer circumference surface of the second cam 410 on an upper side of the second cam 410, such that the connection shaft 423 rotates to correspond to a shape of the outer circumferential surface of the second cam 410 when the second cam 410 rotates, and the slide shaft 421 positioned on one side in the length direction pulls or pushes the slide member 100B-2 backward in response to the rotation of the connection shaft 423.

Figure 5:
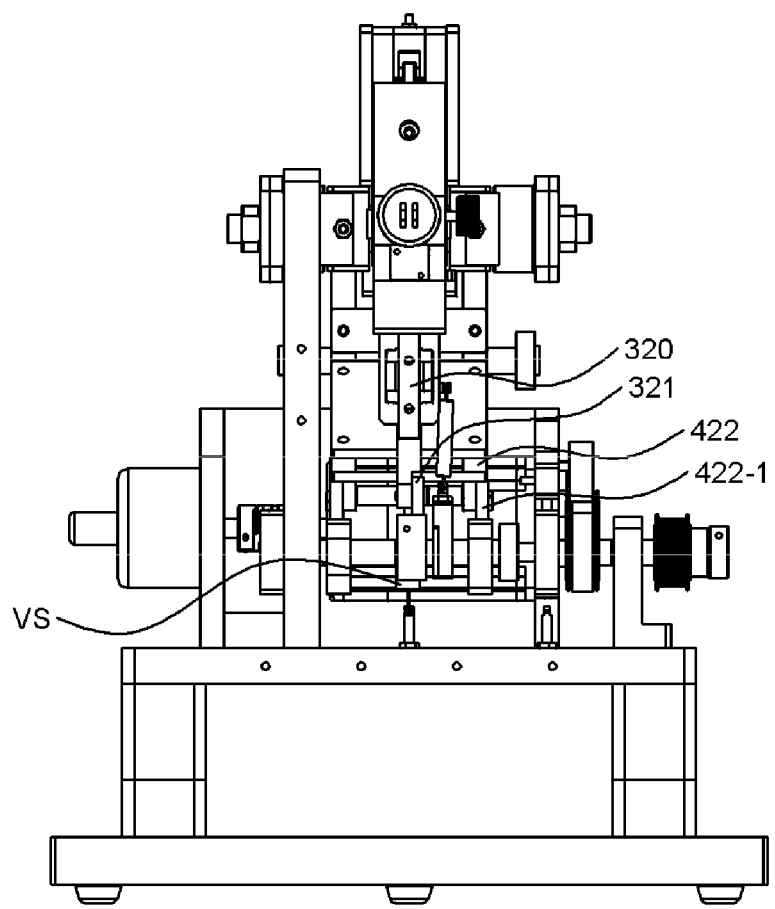
FIG. 5 is a front view illustrating the ultra microtome device according to the present invention.

FIG. 5 illustrates a front view of the ultra microtome device according to the present invention.

Referring to FIGS. 1 and 5, according to the present invention, the first shaft 420 may further include a first roller 321 formed on the other side in the length direction in contact with the first cam 310, the second shaft 420 may further include a second roller 422-1 formed on the other side of the power transmitting shaft 422 in the length direction thereof disposed in contact with the second cam 410, and an outer circumferential surface of the first roller 321 and the second roller 422-1 in contact with the first cam 310 and the second cam 410 is formed of a urethane material, such that urethane may absorb the shock generated by the contact between the cams and the rollers to minimize vibration generated when the device is driven. In addition, each driving part that generates vibrations is connected to a vibration-proof spring VS to minimize vibrations generated from the driving parts.

Figure 6:
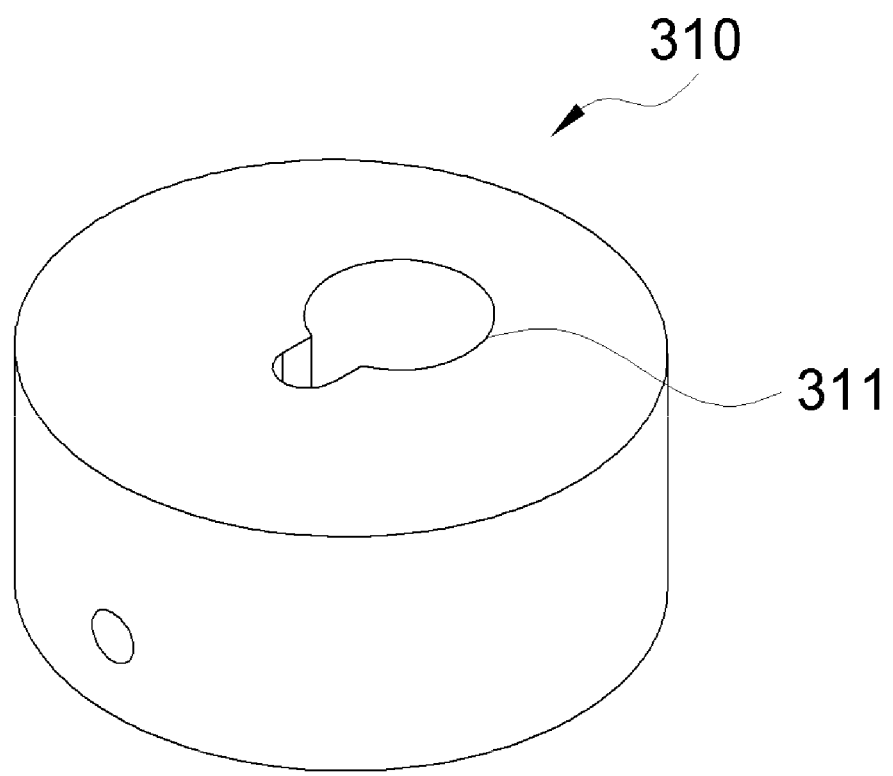
FIG. 6 is a perspective view illustrating a first cam of the ultra microtome device according to the present invention.
Figure 7:
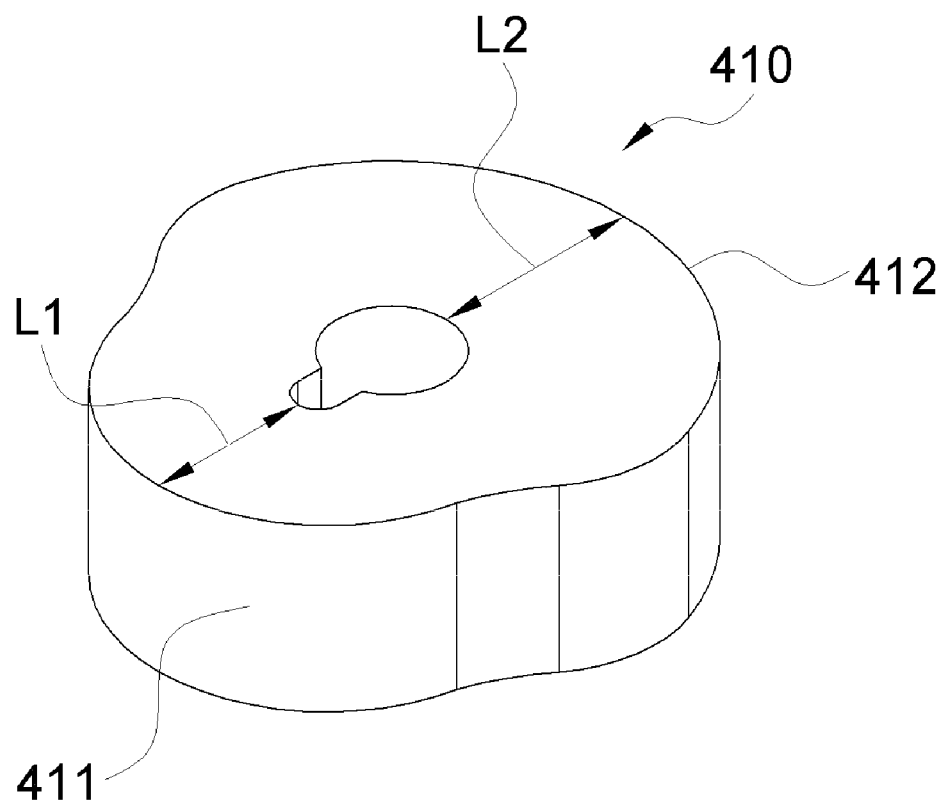
FIG. 7 is a perspective view illustrating a second cam of the ultra microtome device according to the present invention.

In addition, in the ultra microtome device 1000 according to the present invention, the first cam 310 and the second cam 410 need to have a specific shape as illustrated in FIGS. 6 and 7 to implement the first to fifth motions M1 to M5 described above.

Referring to FIGS. 6 and 7, as illustrated in FIG. 6, a rotation shaft coupling hole 311 into which the power transmitting shaft 510 is fitted is eccentrically disposed in the first cam 310 having a circular cross-sectional shape. As illustrated in FIG. 7, the second cam 410 may have a cross-sectional shape in which a first protrusion 411 of an arc shape having a radius length of L1 is formed on one side in a radial direction, and a second protrusion 412 of an arc shape having a radius length of L2 is formed on the other side in the radial direction (L1<L2).

In detail, the first cam 310 has the circular cross-sectional shape and the rotation shaft coupling hole 311 eccentrically disposed on one side in the radial direction, such that an upward movement in which the first roller 321 positioned the upper side of the first cam 310 moves upward and a downward movement in which the first roller 321 moves downward are repeated when the first cam 310 rotates. The second cam 410 has the first protrusion 411 and the second protrusion 412 having different radii on an edge surface thereof to convert the rotational motion of the specimen restraint part 100 moving along the edge of the circle into the first motion M1 to the fifth motion M5 illustrated in FIG. 3.

Figure 8:
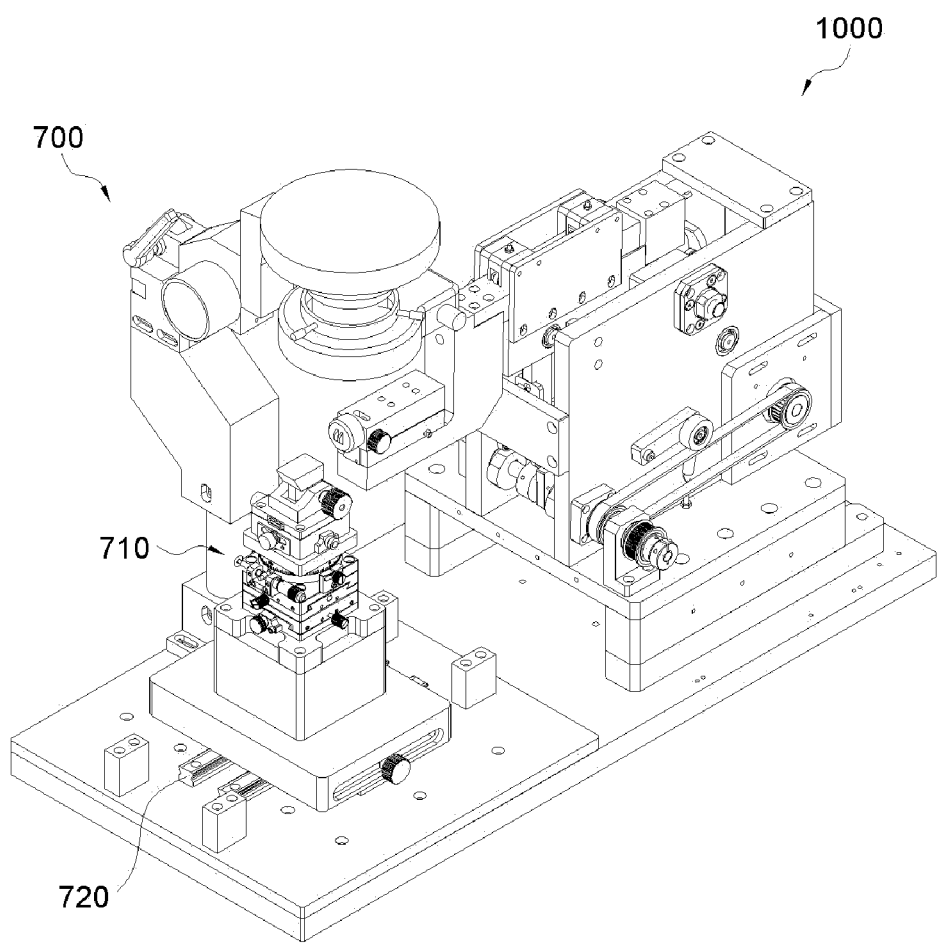
FIG. 8 is a perspective illustrating a knife holder formed in the ultra microtome device according to the present invention.

In addition, referring to FIG. 8, the ultra microtome device 1000 according to the present invention may further include a knife holder 700 disposed to be spaced apart from the sample holder 110 by a predetermined interval.

In detail, a knife for cutting the specimen fixed to the sample holder 110 is positioned on the knife holder, and the specimen positioned on the sample holder 110 is cut by the knife fixed to the knife holder 700 when the specimen restraint part 100 implements the designated motion.

In addition, the knife holder 700 may include a nano jig 720 that may precisely move a knife holder body 710 forward and backward. According to the present invention, the sample holder 110 may have a structure in which the fixed specimen is moved forward and backward even in a state in which the one side specimen restraint part 100A is fixed to a predetermined position.

The ultra microtome device according to the present invention may repeatedly implement a constant motion during driving by configuring the drive system with the cam.

In addition, since the cams that implement different motions have one rotation shaft, it is possible to minimize error in the implementation of complex motion generated when each cam is individually operated in a case in which each cam has different rotation shafts from each other.

In detail, when the motions implemented by each cam are combined to implement the complex motion, the time point at which each cam is driven or the speed at which each cam is driven is slightly different, resulting in a problem in which the complex motion differs from any designated motion. Therefore, such a problem is solved by allowing different cams to have one rotation shaft.

The present invention is not limited to the abovementioned exemplary embodiments, but may be variously applied. In addition, the present invention may be variously modified by those skilled in the art to which the present invention pertains without departing from the gist of the present invention claimed in the claims.

DETAILED DESCRIPTION OF MAIN ELEMENTS

100: specimen restraint part
100A: one side specimen restraint part
100B: the other side specimen restraint part
100B-1: guide part
100B-2: slide member
100B-3: elastic coupling part
100B-3A: elastic member
110: sample holder
121: first rotation coupling part
200: power part
300: up and down motion implementing part
310: first cam
311: rotation shaft coupling hole
320: first shaft
400: forward and backward motion implementing part
410: second cam
411: first protrusion
412: second protrusion
420: second shaft
421: slide shaft
422: power transmitting shaft
423: connection shaft
423-1: second rotation coupling part
500: power transmitting part
510: power transmitting shaft
520: power transmitting pulley
600: fixing plate
700: knife holder

The invention claimed is:

1. An ultra microtome device comprising:
a specimen restraint part having a sample holder formed on one side in a length direction, wherein a specimen is mounted on the sample holder;
a power part for transmitting power for implementing a motion of the specimen restraint part;
an up and down motion implementing part including a first cam rotated by a force transmitted from the power part and a first shaft for implementing an up and down motion of the specimen restraint part in response to the rotation of the first cam; and
a forward and backward motion implementing part including a second cam rotated by the force transmitted from the power part and a second shaft for implementing a forward and backward motion of the specimen restraint part in response to the rotation of the second cam.

2. The ultra microtome device of claim 1, further comprising a power transmitting part including a power transmitting shaft which is a rotation shaft of the first cam and the second cam, and a power transmitting pulley coupled to one side of the power transmitting shaft in a length direction thereof and receiving the force from the power part to rotate the power transmitting shaft.

3. The ultra microtome device of claim 2, further comprising a fixing plate disposed on a side surface of the specimen restraint part,
wherein a first rotation coupling part rotatably coupled to the fixing plate is formed on the other side of the specimen restraint part in the length direction thereof.

4. The ultra microtome device of claim 3, wherein one side of the first shaft in the length direction is coupled to one side of the specimen restraint part in the length direction, and the other side thereof in the length direction is disposed in contact with the first cam.

5. The ultra microtome device of claim 4, wherein the specimen restraint part is divided into one side specimen restraint part to which the sample holder is coupled, and the other side specimen restraint part to which the first rotation coupling part is formed, and
the other side specimen restraint part includes a guide part in which a slide rail is formed, a slide member sliding along the guide part, and an elastic coupling part connected to the slide member through an elastic member.

6. The ultra microtome device of claim 5, wherein the second shaft includes a slide shaft positioned on one side thereof in the length direction and connected to the slide member, a power transmitting shaft positioned on the other side thereof in the length direction and disposed in contact with the second cam, and a connection shaft having one side in the length direction rotatably coupled to the slide shaft, the other side in the length direction coupled to the power transmitting shaft, and a second rotation coupling part formed on a side surface thereof and rotatably coupled to the fixing plate.

7. The ultra microtome device of claim 6, further comprising a knife holder disposed to be spaced apart from the sample holder by a predetermined interval.

8. The ultra microtome device of claim 7, wherein a rotation shaft coupling hole into which the power transmitting shaft is fitted is eccentrically disposed in the first cam having a circular cross-sectional shape.

9. The ultra microtome device of claim 8, wherein the second cam has a first protrusion of an arc shape having a radius length of L1 formed on one side in a radial direction and a second protrusion of an arc shape having a radius length of L2 formed on the other side in the radial direction (L1<L2).

10. An ultra microtome device for processing a target object by repeatedly implementing a specific motion, the ultra microtome device comprising:
 a specimen restraint part in which a sample holder on which a specimen is mounted is formed;
 a power part for transmitting power for implementing a motion of the specimen restraint part;
 a first shaft rotated by a force transmitted from the power part;
 a plurality of cams coupled to the first shaft to be simultaneously rotated when the first shaft is rotated, and having a specific shape for adjusting the motion of the specimen restraint part; and
 a plurality of shafts having one side in a length direction disposed in contact with any one of the cams and the other side in the length direction connected to the specimen restraint part and converting a force pushed by the cam when the cam rotates into a force for implementing the motion of the specimen restraint part.

* * * * *